US010430950B2

(12) United States Patent
Huang

(10) Patent No.: US 10,430,950 B2
(45) Date of Patent: Oct. 1, 2019

(54) SYSTEMS AND METHODS FOR PERFORMING INSTANCE SEGMENTATION

(71) Applicant: HONDA MOTOR CO., LTD., Tokyo (JP)

(72) Inventor: Jiawei Huang, San Jose, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 71 days.

(21) Appl. No.: 15/909,669

(22) Filed: Mar. 1, 2018

(65) Prior Publication Data

US 2019/0272645 A1 Sep. 5, 2019

(51) Int. Cl.
*G06T 7/162* (2017.01)
*G06T 7/136* (2017.01)
*G06N 3/08* (2006.01)
*G06N 20/00* (2019.01)

(52) U.S. Cl.
CPC .............. *G06T 7/162* (2017.01); *G06N 3/08* (2013.01); *G06N 20/00* (2019.01); *G06T 7/136* (2017.01); *G06T 2207/20084* (2013.01); *G06T 2207/20161* (2013.01)

(58) Field of Classification Search
CPC ......... G06T 7/194; G06T 7/162; G06T 7/136; G06T 7/11; G06T 7/12; G06T 2207/20088; G06T 2207/20161; G06T 2207/10024; G06N 20/00; G06N 3/08; G06K 9/6269; G06K 9/4652; G06K 9/6256
USPC ........................................................ 382/173
See application file for complete search history.

(56) References Cited

U.S. PATENT DOCUMENTS 9,111,356 B2 8/2015 Yoo et al.
9,740,963 B2 8/2017 Sawhney et al.
2014/0064580 A1* 3/2014 Madabhushi ......... G06T 7/0012
382/128

(Continued)

OTHER PUBLICATIONS

Appel, K., et. al., "The Four Color Problem." Mathematics Today Twelve Informal Essays, Conference Board of the Mathematical Science, pp. 153-180, 1978.

(Continued)

*Primary Examiner* — Ali Bayat
(74) *Attorney, Agent, or Firm* — Arent Fox LLP

(57) ABSTRACT

Systems and methods for performing instance segmentation. A memory stores instructions for executing processes for performing instance segmentation and a processor configured to execute the instructions. The processes include: generating a learning objective that uses pair-wise relationships between pixels in an input image; sampling pixels in each object instance to determine whether the sampled pixels are within a same object instance; training a neural network using the learning objection, wherein the neural network is configured to make pixel-wise predictions and to assign a cluster index to each pixel of the input image, with each pixel cluster being an object instance; performing graph coloring to assign a color to each object instance, with adjacent object instances having different colors; performing connected component extraction to recover each object instance based on the graph coloring; and generating a rendered image having the assigned color applied to each object instance.

20 Claims, 8 Drawing Sheets
(4 of 8 Drawing Sheet(s) Filed in Color)

(56) References Cited

U.S. PATENT DOCUMENTS

| | | | | |
|---|---|---|---|---|
| 2014/0293091 | A1* | 10/2014 | Rhoads | G01J 3/513 348/234 |
| 2016/0187199 | A1* | 6/2016 | Brunk | G01J 3/2823 348/89 |
| 2017/0076446 | A1* | 3/2017 | Pedersen | G06T 7/0012 |
| 2017/0278289 | A1* | 9/2017 | Marino | G06T 7/44 |
| 2018/0336454 | A1* | 11/2018 | Lim | G06N 3/0472 |

OTHER PUBLICATIONS

Arnab, A. et. al., "Pixelwise Instance Segmentation with a Dynamically Instantiated Network." IEEE Conference on Computer Vision and Patter Recognition (CVPR), Jun. 2016.

Bai, M., et. al. "Deep Watershed Transform for Instance Segmentation" IEEE Conference on Computer Vision and Pattern Recognition (CVPR), Jul. 2017.

Brabandere, B. et. al., "Semantic Instance Segmentation with a Discriminative Loss Function." CORR,abs/1708.02551, 2017.

Chopra, S., et. al., "The Partition Problem." Mathematical Programming 59, North-Holland pp. 87-115, 1993.

Cordts, M., et. al., "The Cityscapes Dataset for Semantic Urban Scene Understanding." IEEE Conference on Computer Vision and Pattern Recognition (CVRP), Jun. 2016.

CVPR 2017 Workshop on Autonomous Driving Challenge Leaderboard. http://benchmark.tusimple.ai/#/t/1/leaderboard, 2017(Accessed Jul. 21, 2017.).

Dai, J., et. al., "Fully Convolutional Instance-aware Semantic Segmentation," Tsinghua University, Microsoft Research Asia, pp. 2359-2367.

Dai, J., et. al., "Instance-Aware Semantic Segmentation via Multi-task Network Cascades." IEEE Conference on Computer Vision and Pattern Recognition, pp. 3150-3158, 2016.

Dai, J., et. al., "Instance-Sensitive Fully Convolutional Networks," European Conference on Computer Vision, pp. 534-549, Springer 2016.

Dai, J., et. al., "R-FCN:Object Detection via Region-Based Fully Convolutional Networks." In Advances in Neural Information Processing Systems, pp. 379-387, 2016.

Hayder, Z., et. al., Boundary-aware Instance Segmentation. IEEE Conference on Computer Vision and Pattern Recognition (CVPR), Jul. 2017.

He, K., et. al., "Deep Residual Learning for Image Recognition. Proceedings of IEEE Conference on Computer Vision and Pattern Recognition." pp. 770-778, 2016.

He, K., et. al., "Mask-r-cnn." IEEE International Conference on Computer Vision (ICCV), Oct. 2017.

Hsu, Y.C., et. al., "Neural Network-Based Clustering Using Pairwise Constraints," ICLR workshop, 2016.

Ioffe, S., et. al., "Batch Normalization: Accelerating Deep Network Training by Reducing Internal Covariate Shift." in International Conference on Machine Learning, pp. 448-456, 2015.

Jin, L., et. al., "Object Detection Free Instance Segmentation with Labeling Transformations," arXiv preprint arXiv: 1611.08991, 2016.

Kirillov, A., et. al., "InstanceCut: From Edges to Instances with Multicut." IEEE Conference on Computer Vision and Pattern Recognition (CVPR), Jul. 2017.

Levinkov, E., et. al., "Joint Graph Decomposition & Node Labeling: Problem, Algorithms, Applications." IEEE Conference on Computer Vision and Pattern Recognition (CVPR), 2017.

Liang, X., et. al., "Proposal-free Network for Instance-Level Object Segmentation." arXiv preprint arXiv: 1509.02636, 2015.

Lin, T.-Y. et. al., "Feature Pyramid Networks for Object Detection." in CVPR, 2017.

Liu, S., et. al., "SGN: Sequential Grouping Networks for Instance Segmentation." IEEE International Conference on Computer Vision (ICCV), Oct. 2017.

Long, J., et. al., "Fully Convolutional Networks for Semantic Segmentation." Proceedings of the IEEE Conference on Computer Vision and Pattern Recognition, pp. 3431-34440, 2015.

Ren, S., et al., "Faster R-CNN:Towards Real-Time Object Detection with Region Proposal Networks." In Advances in Neural Information Processing Systems (NIPS), 2015.

Romera-Paredes, B., et. al., "Recurrent Instance Segmentation." In European Conference on Computer Vision, pp. 312-329. Springer, 2016.

TuSimple Benchmark Platform, Lane Detection Challenge,http://benchmark.tusimple.ai/#/t/1/leaderboard.

Uhrig, J., et. al., "Pixel-Level Encoding and Depth Layering for Instance-Level Semantic Labeling." In German Conference on Pattern Recognition, pp. 14-25, Springer, 2016.

Zagoruyko, S., et. al., "A Multipath Network for Object Detection." In Proceedings of the British Machine Vision Conference 2016, BMVC 2016, York, UK, Sep. 19-22, 2016.

Zhao, H., et. al., "Pyramid Scene Parsing Network." Proceedings of IEEE Conference on Computer Vision and Pattern Recognition (CVPR), 2017.

De Brabandere, B., et.al., "Semantic Instance Segmentation for Automous Driving," CVPRW, 2017 IEEE Conference, pp. 478-480, 2017.

Maire, M, et. al., "Affinity CNN:Learning Pixel-Centric Pairwise Relations for Figure/Ground Embedding,"IEEE Conference on Computer Vision and Pattern Recognition, pp. 174-182, 2016.

Malhotra, A., et. al., "Car Image Segmentation Using Convolutional Neural Nets,"https://medium.com/weightsandbiases/car-image-segmentation-using-convolutional-neural-nets-7642448028f6, 2017.

Pham, V., et. al., "BiSeg.Simultaneous Instance Segmentation and Semantic Segmentation with Fully Convolutional Networks," Corporate Research and Development, Toshiba Corporation, 2017.

Zhang, Z., et. al., "Instance-level Segmentation for Autonomous Driving Deep Densely Connected MRF's," IEEE Conference on Computer Vision and Pattern Recognition, pp. 669-677, 2016.

* cited by examiner

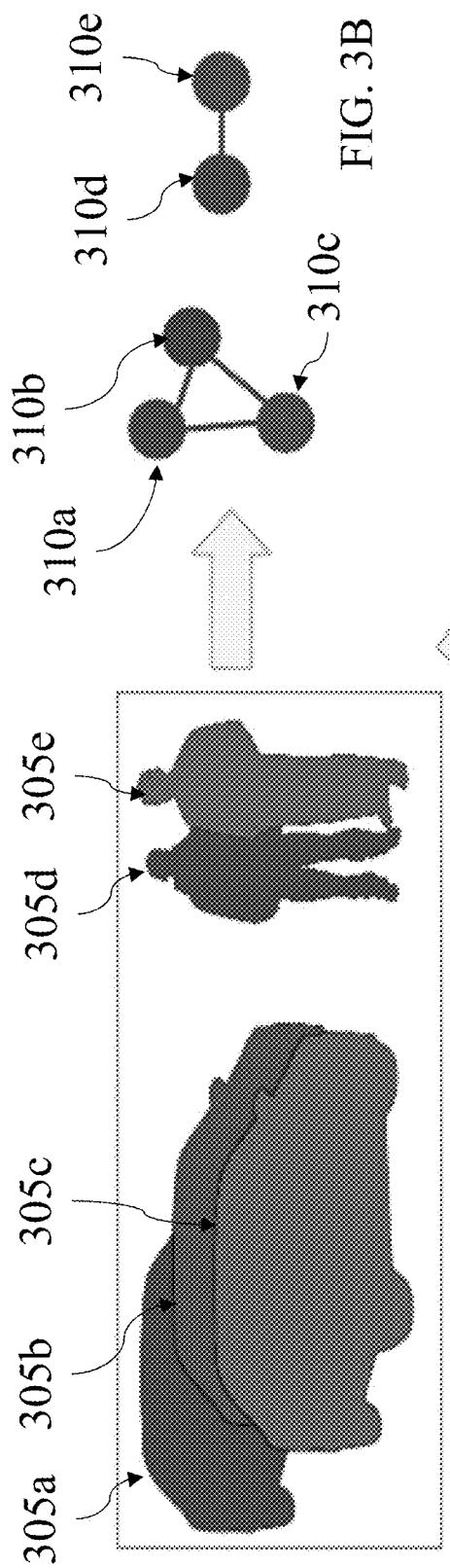
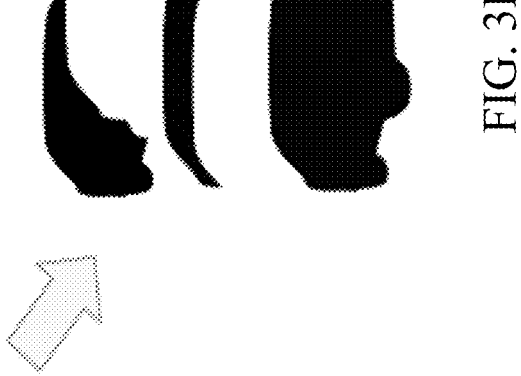
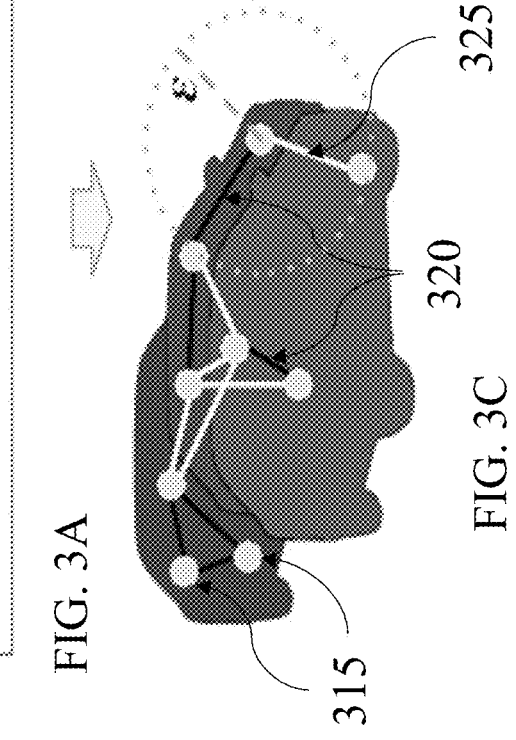
FIG. 3A
FIG. 3B
FIG. 3C
FIG. 3D

SYSTEMS AND METHODS FOR PERFORMING INSTANCE SEGMENTATION

TECHNICAL FIELD

This disclosure relates to methods and systems for performing instance segmentation.

BACKGROUND

Instance segmentation is a task that may combine requirements from both semantic segmentation and object detection, and may require both pixel-wise semantic labeling and instance labeling to differentiate each object at a pixel level. Because semantic labeling may be obtained from an existing semantic segmentation approach, most instance segmentation methods focus on dealing with the instance labeling problem. This may be achieved by assigning a unique identifier to all of the pixels belonging to an object instance.

Instance labeling may become a more challenging task when occlusions occur, or when a vastly varying number of objects in a cluttered scene exist. Techniques to solve instance segmentation may include proposal-based methods and proposal-free methods. In proposal-based methods, a set of object proposals and their classes are first predicted, then foreground-background segmentation is performed in each bounding box. In contrast, proposal-free methods exclude predicting object proposals. Both of these approaches may include two stages: 1) learning a representation (e.g. a feature vector, an energy level, breakpoints, or object boundaries) at the pixel level; and 2) grouping the pixels using a clustering algorithm with the learned representation. Additionally, the proposal-free methods may focus on instance labeling and directly leverage the categorical predictions from semantic segmentation for the semantic labeling.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system for performing instance segmentation. The system includes a memory that stores instructions for executing processes for performing instance segmentation and a processor configured to execute the instructions. The processes include: generating a learning objective that uses pair-wise relationships between pixels in an input image; sampling pixels in each object instance to determine whether the sampled pixels are within a same object instance; training a neural network using the learning objection, wherein the neural network is configured to make pixel-wise predictions and to assign a cluster index to each pixel of the input image, with each pixel cluster being an object instance; performing a graph coloring to assign a color to each of the object instances, with adjacent object instances having different colors; performing a connected component extraction to recover each object instance based on the graph coloring; and generating a rendered image having the assigned color applied to each object instance.

In another aspect, the present disclosure is related to a method for performing instance segmentation. The method includes: generating a learning objective that uses pair-wise relationships between pixels in an input image; sampling pixels in each object instance to determine whether the sampled pixels are within a same object instance; training a neural network using the learning objection, wherein the neural network is configured to make pixel-wise predictions and to assign a cluster index to each pixel of the input image, with each pixel cluster being an object instance; performing a graph coloring to assign a color to each of the object instances, with adjacent object instances having different colors; performing a connected component extraction to recover each object instance based on the graph coloring; and generating a rendered image having the assigned color applied to each object instance.

In a further aspects, the present disclosure is related to a non-transitory computer-readable storage medium containing executable computer program code. The code comprises instructions configured to cause a computing device to: generate a learning objective that uses pair-wise relationships between pixels in an input image; sample pixels in each object instance to determine whether the sampled pixels are within a same object instance; train a neural network using the learning objection, wherein the neural network is configured to make pixel-wise predictions and to assign a cluster index to each pixel of the input image, with each pixel cluster being an object instance; perform a graph coloring to assign a color to each of the object instances, with adjacent object instances having different colors; perform a connected component extraction to recover each object instance based on the graph coloring; and generate a rendered image having the assigned color applied to each object instance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

FIGS. 3A-3D illustrate sample processes for applying graph coloring, according to aspects of the present disclosure;

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
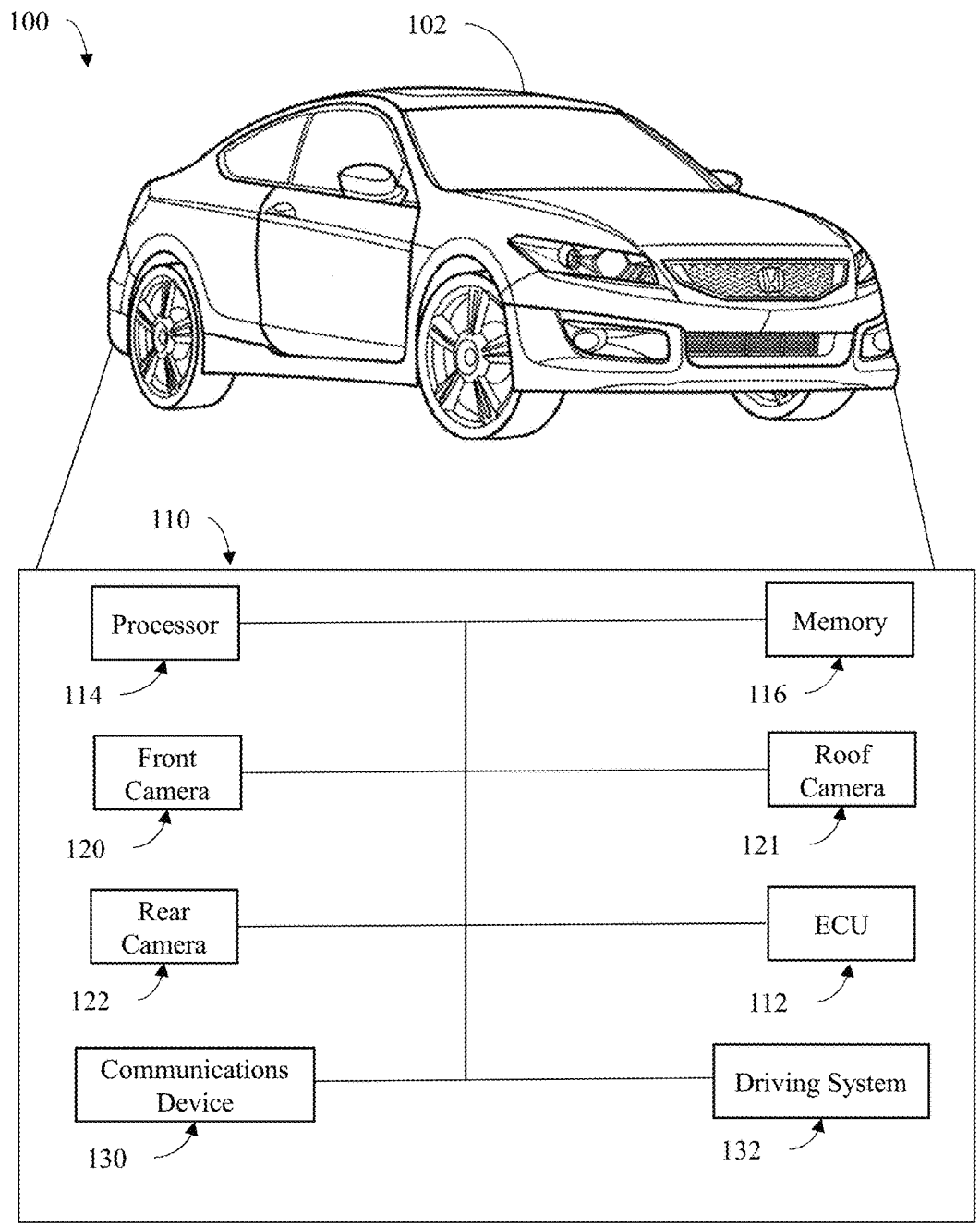
FIG. 1 illustrates a schematic view of an exemplary operating environment of a data acquisition system in accordance with aspects of the present disclosure.

Generally described, the present disclosure provides systems and methods performing instance segmentation. Turning to FIG. 1, a schematic view of an example operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may include a front camera or other image-capturing device (e.g., a scanner) 120, roof camera or other image-capturing device (e.g., a scanner) 121, and rear camera or other image capturing device (e.g., a scanner) 122 that may also be connected to the ECU 112 to provide images of the environment surrounding the vehicle 102. The vehicle system 110 may also include a processor 114 and a memory 116 that communicate with the front camera 120, roof camera 121, rear camera 122, communications device 130, and driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a front camera 120, a roof camera 121, and a rear camera 122. Each of the front camera 120, roof camera 121, and the rear camera 122 may be a digital camera capable of capturing one or more images or image streams, or may be another image capturing device, such as a scanner. The front camera 120 may be a dashboard camera configured to capture an image of an environment directly in front of the vehicle 102. The roof camera 121 may be a camera configured to broader view of the environment in front of the vehicle 102. The front camera 120, roof camera 121, and/or rear camera 122 may also provide the image to a driving system 132.

Figure 2:
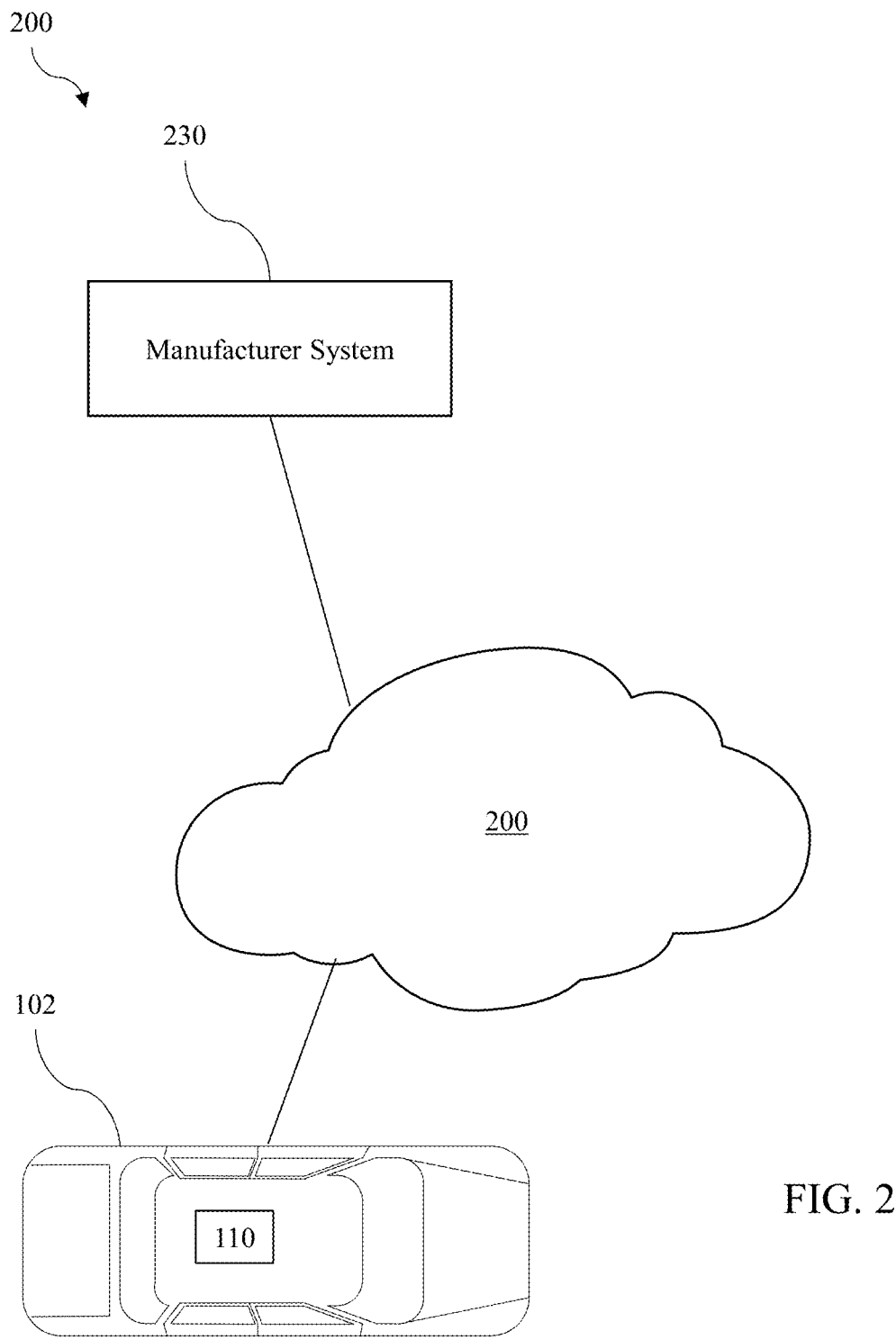
FIG. 2 illustrates an exemplary network for managing the data acquisition system, according to aspects of the present disclosure.

FIG. 2 illustrates an exemplary network 200 for managing the vehicle system 110. The network 200 may be a communications network that facilitates communications between multiple systems. For example, the network 200 may include the Internet or another internet protocol (IP) based network. The network 200 may enable the vehicle system 110 to communicate with a manufacturer system 230.

The vehicle system 110 within the vehicle 102 may communicate with the network 200 via the communications device 130. The vehicle system 110 may, for example, transmit images captured by the front camera 120, roof camera 121, and/or the rear camera 122 to the manufacturer system 230.

Figure 7:
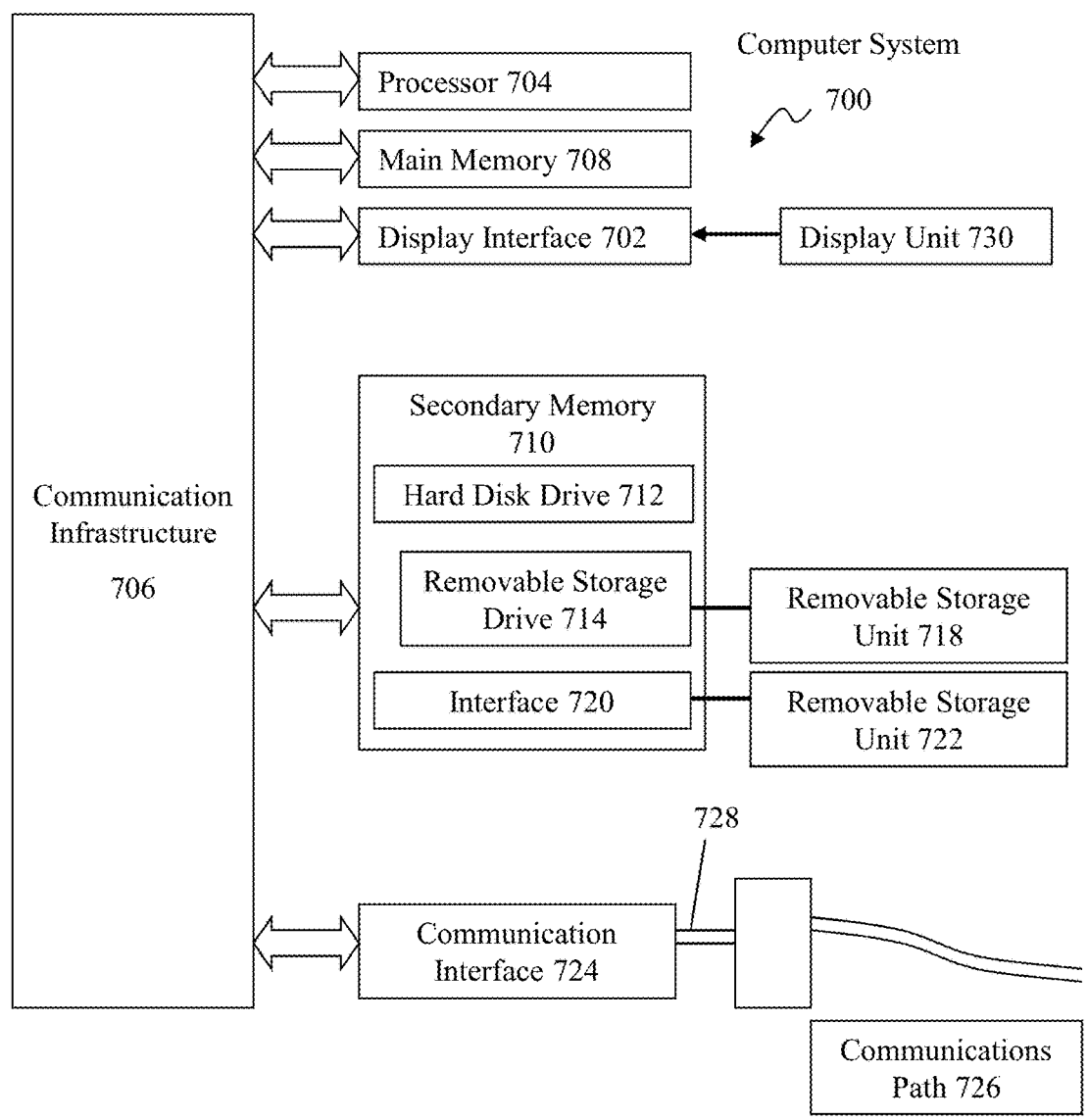
FIG. 7 illustrates various features of an exemplary computer system for use in conjunction with aspects of the present disclosure.

The manufacturer system 230 may include a computer system, as shown with respect to FIG. 7 and further described below, associated with one or more vehicle manufacturers or dealers. The manufacturer system 230 may include one or more databases that store data collected by the front camera 120, roof camera 121, and/or the rear camera 122. The manufacturer system 230 may also include a memory that stores instructions for executing processes for performing instance segmentation and a processor configured to execute the instructions.

According to aspects of the present disclosure, the manufacturer system 230 may be configured to generate a learning objective, which uses pairwise relationship as supervision, and to apply the learning objective to train a fully convolutional network (FCN) to perform pixel-wise clustering. The resulting clusters may be used for instance labeling. In some aspects, the FCN may learn to assign a cluster index to each pixel, with each pixel cluster being regarded as an object instance. In some aspects, the clustering may be done by a forward propagation of the FCN.

According to some aspects, the number of cluster indices available in the FCN may limit the number of instances that may be separated using the techniques described herein. To resolve this and to support labeling of any number of instances, the manufacturer system 230 may incorporate graph coloring techniques into the learning objective. As a result, the FCN may be trained to assign different indices for the neighboring instances, while reusing the index for the objects that are far away from each other. With the coloring result, each individual instance may be naively recovered by connected components extraction.

In some aspects, the manufacturer system 230 may perform an instance labeling task. To achieve this, using an input image, e.g., an image obtained from the vehicle 102, the manufacturer system 230 may predict a mask for each instance of the input image. This may be achieved by assigning an index to each of the pixels in the mask, with the index being an integer i, $1 \leq i \leq n$, where n is the number of instances in the input image. In some aspects, the index between any two masks may be swapped with one another and still provide a valid assignment and equivalent segmentation. In some aspects, the goal of the instance labeling task may be to learn a function $f$, which may assign a value $y_i = f(p_i)$ for a pixel $p_i$, where $y_i \in \mathbb{Z}$ and i is the index of the pixel in an image. As a result, the labeling of all pixels in an image, i.e., $Y = \{y_i\} \forall_i$, may fulfill a relationship R, where for any two pixels $p_i$, $p_j$, $R(p_i, p_j) \in \{0, 1\}$ may be defined according to equation (1):

$$R(p_i, p_j) = \begin{cases} 1, & \text{if } p_i, p_j \text{ belong to the same instance.} \\ 0, & \text{otherwise.} \end{cases} \quad (1)$$

In some aspects, R may be used as the supervision for training.

In further aspects, the manufacturer system 230 may train a FCN, which may be used to make the pixel-wise prediction. The outputs of the FCN may be defined as the probability of assigning a pixel to a given index, which may a multinomial distribution. In some aspects, when two or more pixels belong to the same instance, their predicted distributions may be similar to one another and a distance between the predicted distributions of the two or more pixels may be evaluated using a Kullback-Leibler divergence. For example, given a pair of pixels $p_i$ and $p_j$, their corresponding output distributions may be denoted as $P_i = f(p_i) = [t_{i,1} \ldots t_{i,n}]$ and $P_j = f(p_j) = [t_{j,1} \ldots t_{j,n}]$, where n is the number of indices available for labeling. In some aspects, a cost between the two or more pixels belonging to the same instance may be given by equation (2):

$$\mathcal{L}(p_i, p_j)^+ = \mathcal{D}_{KL}(\mathcal{P}_i^* \| \mathcal{P}_j) + \mathcal{D}_{KL}(\mathcal{P}_j^* \| \mathcal{P}_i), \quad (2)$$

where $\mathcal{D}_{KL}(\mathcal{P}_i^* \| \mathcal{P}_j) = \sum_{k=1}^{n} t_{i,k} \log\left(\frac{t_{i,k}}{t_{j,k}}\right)$.

Thus, the cost $L(p_i, p_j)^+$ may be symmetric with respect to $p_i, p_j$, in which $P_i^+$ and $P_j^+$ may alternatively be assumed to be constant. In further aspects, if $p_i, p_j$ are from different instances, their output distributions may be different from one another, which may be described by a hinge-loss function.

In still further aspects, the manufacturer system 230 may evaluate how the outputs of the function $f$ are compatible with R in the form of a contrastive loss using equation (3):

$$\mathcal{L}(p_i, p_j) = R(p_i, p_j) \mathcal{L}(p_i, p_j)^+ + (1 - \mathcal{L}(p_i, p_j)) R(p_i, p_j)^-. \quad (3)$$

In some aspects, the outputs for each pixel may be a n+1 dimensional vector (n being the number of instances in the image), which represents the probability distribution of this pixel being assigned to a given instance ID. In some aspects, equation (3) may be used to guide the function $f$ to output a similar distribution for pixels on the same instance.

Additionally, equation (3) may use pairwise information between pixels. Because the number of pairs may increase quadratically with the number of pixels in an image, it may not be feasible to use all pixels in an image. As such, in some aspects, the manufacturer system 230 may adopt a sampling strategy. For example, a fixed number of pixels may be sampled when training the learning objective and only pixels in ground-truth instance masks may be picked. In some aspects, each instance in an image may receive the same number of samples regardless of its size and the pixels in an instance may be randomly sampled with uniform distribution. In further aspects, to create the pairs, all pair-wise relationships between the sampled pixels may be enumerated.

In some aspects, the manufacturer system 230 may treat a background of the input image as one instance, such that it may be handled differently because of its unbalanced nature. Namely, since the background contains a majority of pixels in the input image, the sampled points may be sparse. Thus, the manufacturer system 230 may use a binary classification loss for the background, while the background and other instances still share the same output vector which represents the instance index. To achieve that, the manufacturer system 230 may reserve the index zero for the background of the input image. Given a n+1 dimension predicted outputs $f(p_i) = P_i = [t_{i,0} \ldots t_{i,n}]$, the summation of non-zero indices $[t_{i,1} \ldots t_{i,n}]$ may be a probability of non-background portions of the input image. In some aspects, the manufacturer system 230 may formulate criterion of background classification using equation (4):

$$\mathcal{L}_{bg} = -\frac{1}{N} \sum_{i}^{N} \left( I_i^{bg} \log t_{i,0} + (1 - I_i^{bg}) \log\left(\sum_{k=1}^{n} t_{i,k}\right) \right), \quad (4)$$

where N may be the total number of pixels in an image and $I_i^{bg}$ may be an indicator function, which returns a value of 1 if pixel I is part of the background of the input image. Although the value of $\sum_{k=1}^{n} t_{i,k}$ may be equal to $1 - t_{i,0}$, a resulting derivative may be different, such that the outputs may be $[t_{i,1} \ldots t_{i,n}]$ when $p_i$ is not the background of the input image. In some aspects, an averaged pairwise loss may contain all pairs of sampled pixels, where the averaged pairwise loss may be defined using equation (5):

$$\mathcal{L}_{pair} = \frac{1}{|T|} \sum_{(p_i,p_j) \in T} \mathcal{L}(p_i, p_j) \quad (5)$$

The full formula for instance segmentation may be defined using equation (6):

$$\mathcal{L}_{ins} = \mathcal{L}_{pair} + \mathcal{L}_{bg} \quad (6)$$

In some aspects, the function $f$ may represent a limited number of instance IDs, and consequently, the function $f$ may limit the maximum number of instances that could be detected. To resolve this, the manufacturer system 230 may reformulate the index assignment task as a graph coloring task. For example, FIGS. 3A-3D illustrate sample processes for applying graph coloring. In some aspects, as illustrated in FIG. 3A, a plurality of regions 305a-e may include a plurality of vehicles and a plurality of persons, and, as shown in FIG. 3B, each of the plurality of regions 305a-e may be regarded as a respective vertex 310a-e, and a distance between adjacent regions may be used to determine whether an edge exists or not. In this way, graph coloring may be used to assign a color to each vertex so that neighboring vertices 310a-e have different colors, as illustrated in FIG. 3B. In some aspects, a graph may be called k-colorable when an assignment with k or fewer colors may be found. The minimum k of a graph may be referred to as a chromatic number. In some aspects, k may be less than the number of vertices (i.e., the number of instances). For example, for a distance threshold $\epsilon$ of 1 pixel, there may only be edges between adjacent instances. In further aspects, the graph coloring task may use four colors to ensure that an instance has a color different from its neighbors. Under this condition, a given instance may be extracted by finding connected components at the pixel level, e.g., by growing a region which share the same ID. In some aspects, each connected component may be assigned an ID for the final outputs, as illustrated in FIG. 3D.

In further aspects, the manufacturer system 230 may train a deep neural network to perform the graph coloring. For example, settings of the graph coloring may be relaxed by modifying the sampling. As one example, modifying the sampling may include changing coloring rules from a constraint that must be satisfied to a soft guideline. The soft guideline may include, for example, a rule that "neighboring instances should have different IDs." It should be understood that other soft guidelines are also contemplated in accordance with aspects of the present disclosure. In some aspects, the soft guideline may be used when training the learning objective. Additionally, relaxing the settings of the graph coloring may include setting the distance threshold to a value larger than 1 pixel. In some instances, the threshold may be applied to pairs of the randomly sampled pixels. As a result, as shown in equation (7), T' includes the pairs $(p_i,p_j)$ which have spatial distance $\overline{(p_i p_j)}$ within threshold $\in$:

$$T' = \{(p_i, p_j)\}_{\forall i, j, |\overline{p_i p_j}| \leq \in} \quad (7)$$

As a result, as shown in equation (8), the averaged pairwise loss (e.g., equation (5)) is reduced to:

$$\mathcal{L}_{pair} = \frac{1}{|T'|} \sum_{(p_i,p_j) \in T'} \mathcal{L}(p_i, p_j) \quad (8)$$

In some aspects, equation (5) is a special case of equation (8), with the distance threshold $\epsilon = \infty$. With the distance threshold E being infinity, there are edges between all instances, and as a result, k is be equal to the number of object instances in the input image. When the distance threshold $\epsilon$ decreases, the chromatic number of the graph may also decrease.

FIG. 3C illustrates an example of sampling. Namely, as shown in FIG. 3C, dots 315 are sampled pixels and first edges 320 (black) indicate that its two nodes should have similar predicted label distribution, while second edges 325 (white) represent the dissimilar pairs. In some aspects, any two pixels that have a distance larger than the threshold c are considered to have no edge between them, and as such, do not contribute any loss to the learning objective. For example, as shown in FIG. 3C, each of the dots 315 located within the region 305a are connected to one another using the black edges 320 indicating that the region may have a similar predicted label distribution. In contrast, the dots between different regions, e.g., region 305b and region 305c, are connected to one another via a white edges 325 indicating that the regions are dissimilar pairs.

In some aspects, for applications with a limited number of instances, the manufacturer system 230 may apply the learning objective, for example, lane detection for autonomous vehicles. In further aspects, when a number of instances is unlimited, the manufacturer system 230 may apply a combination of the learning objective and sampling, and perform a connected component extraction to generate the predictions. For the case of an unlimited number of instances, the manufacturer system 230 may utilize external information to help assign a class to each instance. Additionally, for each instance mask, the manufacturer system 230 may average a predicted semantic segmentation probability in the masked region to determine a dominant category. In some aspects, an intersection between the instance mask and the dominant category mask of semantic segmentation may be used as the final instance output.

In further aspects, the manufacturer system 230 may assign each instance a category from the prediction. Because graph coloring may be applied for an unlimited number of instances, the connected component extraction may also be applied, such that an occluded object may be separated into multiple masks. To resolve this, the manufacturer system 230 may use a predicted center of the occluded object to reunite the segments of the occluded object. For example, the predicted center may be obtained for each segment and two segments may be merged when their average center is within a predetermined distance, such as 20 pixels. In some aspects, the merge operation may also be implemented when an object is separated into several segments due to its large size. In some aspects, to calculate an average precision, e.g., a quality measure of the instance segmentation, the manufacturer system may use a confidence score for each instance. For example, a confidence score of 1 to may be assigned to each prediction, except for the instances that have a size that is smaller than a threshold (e.g. 1500 pixel). In the latter case, the confidence score may be its region size (in pixels) divided by the threshold.

Figure 4:
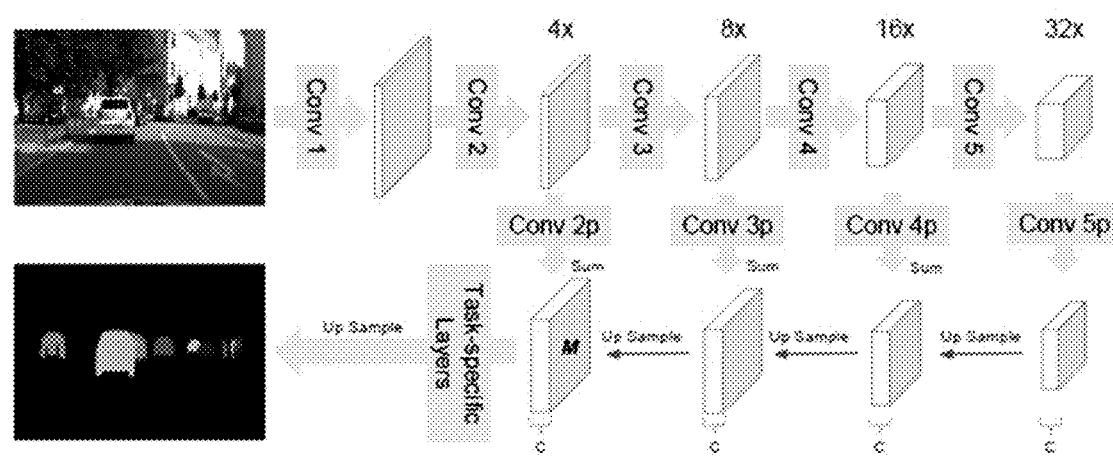
FIG. 4 illustrates an exemplary neural network architecture, according to aspects of the present disclosure.

FIG. 4 illustrates a network architecture used for the FCN. In some aspects, the network architecture may be used for pixel-wise prediction and utilizes a feature map M for task-dependent predictions. In some aspects, an input image 405 is provided to the network architecture that includes a first set of convolutional layers Conv-1 to Conv-5, which may be weighted. In further aspects, the network architecture includes a second set of convolutional layers Conv-2p to Conv-5p. The second set of convolutional layers Conv-2p to Conv-5p may have a kernel size of 3×3 and may be followed by batch normalization and a rectified linear unit ("ReLU"). Additionally, the second set of convolutional layers Conv-2p to Conv-5p may have outputs of channel dimension c, which may be configurable. In further aspects, the outputs of the second set of convolutional layers Conv-2p to Conv-5p layers may be up-sampled and may have element-wise summation with the outputs from lower layers. In some aspects, the resulting feature map M may include c feature channels and may be four times smaller than the input image. Furthermore, as a result of using element-wise summation to combine the features from the first set of convolutional layers Conv-1 to Conv-5 and/or the second set of convolutional layers Conv-2p to Conv-5p, the second set of convolutional layers Conv-2p to Conv-5p may work like learning a residual representation for constructing the map M.

In further aspects, task-specific layers may be added on top of the map M. For example, for the instance ID assignment task, two convolution layers may be added to the map M. The first convolution layer may have a 3×3 kernel and c output channels, followed by batch normalization and ReLU. The second convolution layer may have a 1×1 kernel with n+1 dimension outputs, which maps to n instance IDs and one background ID. In further aspects, additional pixel-wise prediction tasks may also be included here to construct a multi-head structure for multi-task learning. For example, semantic segmentation, boundary detection, depth estimation, and object center prediction may be performed using the same two-layer structure by changing the number of final outputs to fit a target number of categories. In some aspects, network generates an output image 410.

Figure 5:
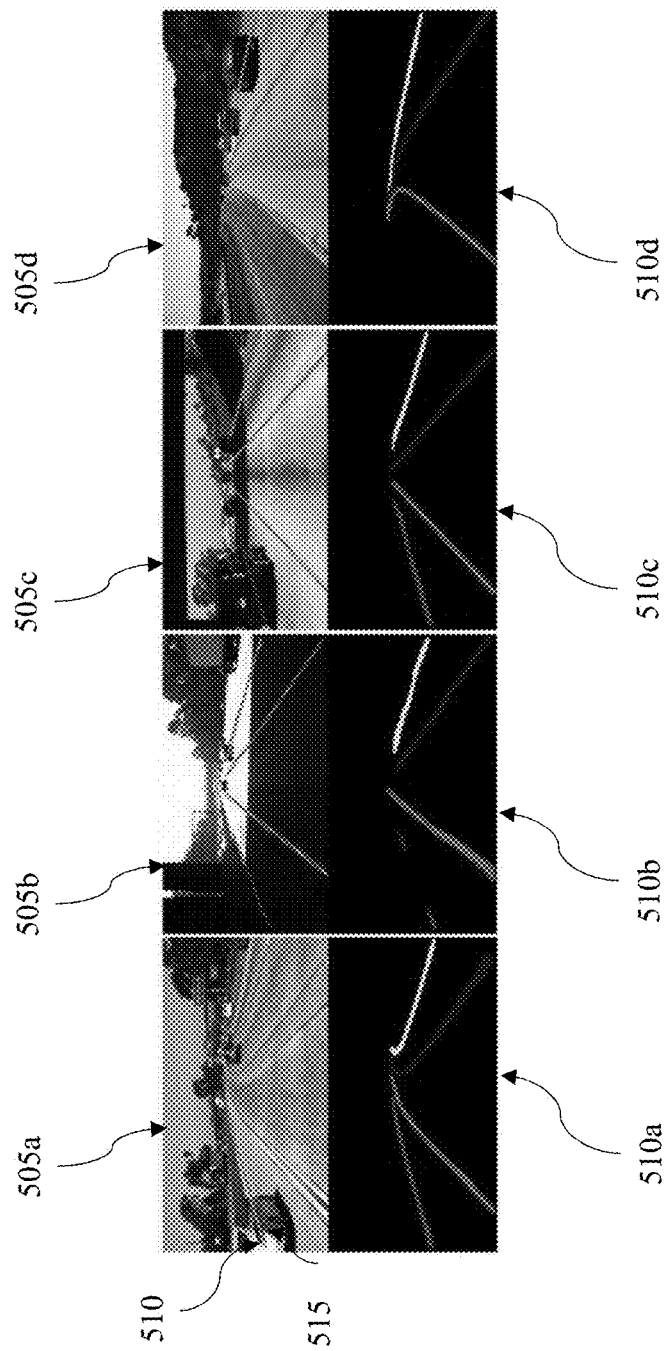
FIGS. 5 and 6 illustrate sample rendered images, according to aspects of the present disclosure.
Figure 6:
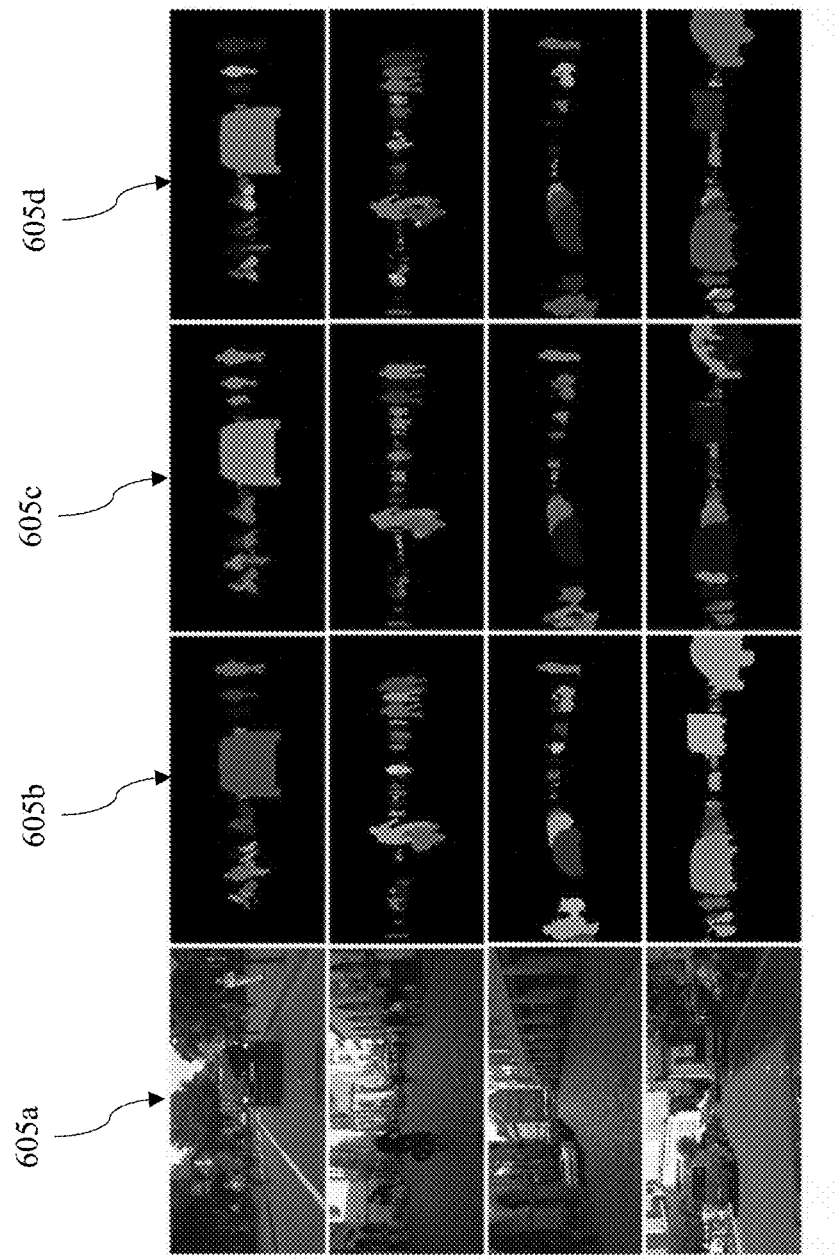

FIGS. 5 and 6 illustrate sample output images generated using the manufacturer system 230 described herein. Namely, FIG. 5 illustrates a top row having input images 505*a-d* with predicted lines (shown in red) and ground-truth lines (shown in green), and a bottom row having output images 502*a-d* generated by the manufacturer system 230 and having different color lines representing the assigned IDs. Additionally, FIG. 6 illustrates a first column of input images 605*a-d*, a second column having a plurality of images 610*a-d* illustrating ground-truths based on respective input images, a third column illustrating raw images 615*a-d*, and a fourth column illustrating final outputs 620*a-d* of the manufacturer system 230 after connected component extraction and merging. In some aspects, different colors illustrated in the final output images represent different instance IDs.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712, and/or a removable storage drive 714, representing a floppy disk drive, a magnetic tape drive, an optical disk drive, a universal serial bus (USB) flash drive, etc. The removable storage drive 714 reads from and/or writes to a removable storage unit 718 in a well-known manner. Removable storage unit 718 represents a floppy disk, magnetic tape, optical disk, USB flash drive etc., which is read by and written to removable storage drive 714. As will be appreciated, the removable storage unit 718 includes a computer usable storage medium having stored therein computer software and/or data.

Alternative aspects of the present invention may include secondary memory 710 and may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 718, a hard disk installed in hard disk drive 712, and signals 728. These computer program products provide software to the computer system 700. Aspects of the present invention are directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features in accordance with aspects of the present invention, as discussed herein. In particular, the computer programs, when executed, enable the processor 704 to perform the features in accordance with aspects of the present invention. Accordingly, such computer programs represent controllers of the computer system 700.

In an aspect of the present invention where the invention is implemented using software, the software may be stored in a computer program product and loaded into computer system 700 using removable storage drive 714, hard drive 712, or communications interface 720. The control logic (software), when executed by the processor 704, causes the processor 704 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

Figure 8:
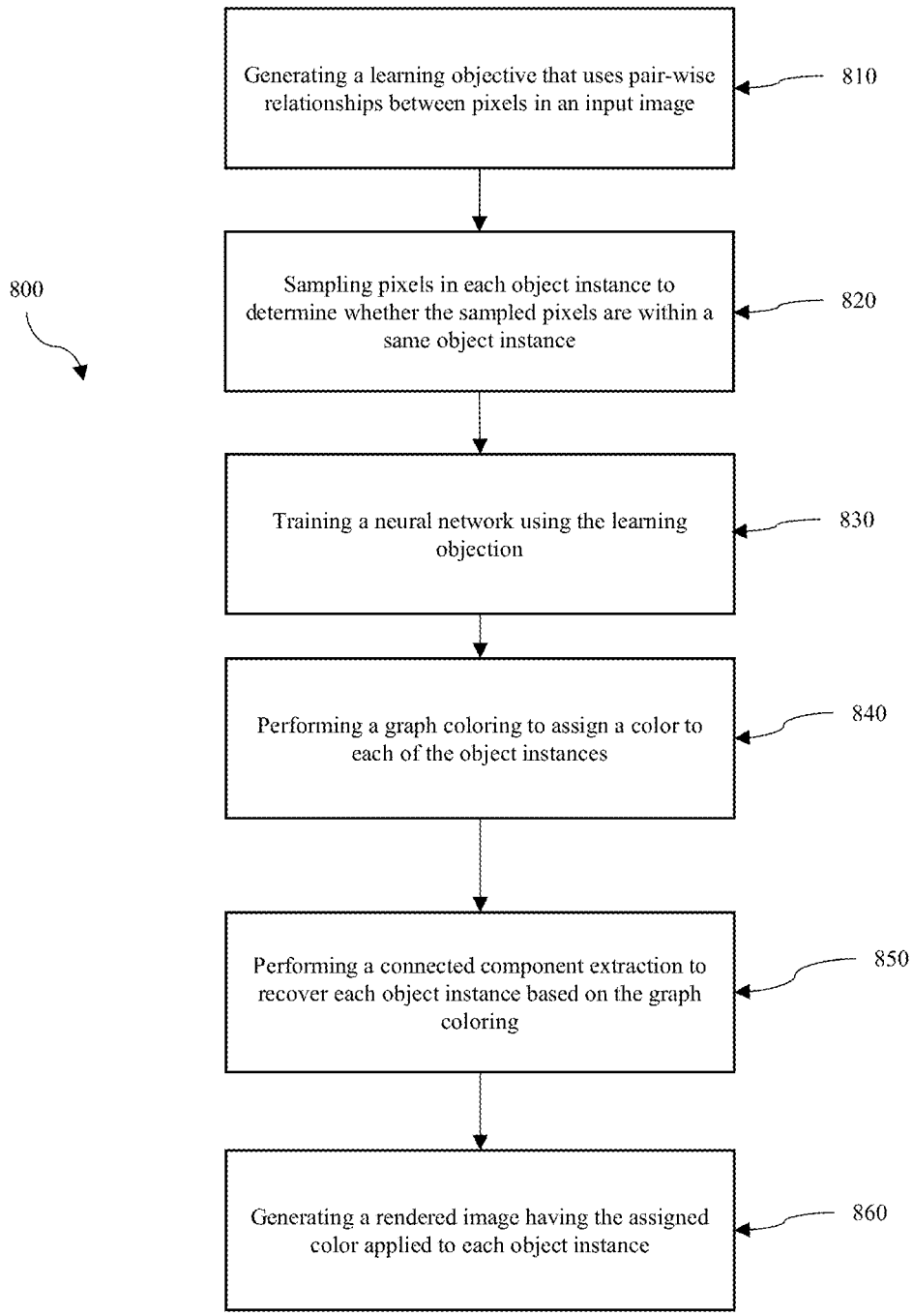
FIG. 8 illustrates an exemplary flowchart method for performing instance segmentation, according to aspects of the present disclosure.

FIG. 8 illustrates a flowchart method for performing instance segmentation, according to aspects of the present disclosure. The method includes generating a learning objective that uses pair-wise relationships between pixels in an input image 810. The method further includes sampling pixels in each object instance to determine whether the sampled pixels are within a same object instance 820. The method also includes training a neural network using the learning objection 830. In some aspects, the neural network may be configured to make pixel-wise predictions and to assign a cluster index to each pixel of the input image, with each pixel cluster being an object instance. The method also includes performing a graph coloring to assign a color to each of the object instances, with adjacent object instances having different colors 840, and performing a connected component extraction to recover each object instance based on the graph coloring 850. The method may also include generating a rendered image having the assigned color applied to each object instance 860.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for executing processes for performing instance segmentation; and
a processor configured to execute the instructions, wherein the processes comprise:
generating a learning objective that uses pair-wise relationships between pixels in an input image;
sampling pixels in each object instance to determine whether the sampled pixels are within a same object instance;
training a neural network using the learning objection, wherein the neural network is configured to make pixel-wise predictions and to assign a cluster index to each pixel of the input image, with each pixel cluster being an object instance;
performing a graph coloring to assign a color to each of the object instances, with adjacent object instances having different colors;
performing a connected component extraction to recover each object instance based on the graph coloring; and
generating a rendered image having the assigned color applied to each object instance.

2. The system of claim 1, wherein generating the learning objective comprises:
predicting a mask for each object instance by assigning the cluster index to each pixel in the mask, wherein the cluster index is an integer between 1 and a total number of the object instances.

3. The system of claim 1, wherein a common cluster index is assigned to a background of the input image.

4. The system of claim 1, wherein, based on the sampling, pixels having distance between them that is larger are determined to have no edge between them.

5. The system of claim 1, wherein pixels within a same object instance have a similar predicted label distribution, and pixels from different object instances are dissimilar pairs.

6. The system of claim 1, wherein the neural network comprises a fully convolutional network.

7. The system of claim 1, wherein the processes further comprise relaxing the of the graph coloring by modifying a sampling rule from a constraint to a soft guideline and setting a distance threshold between pixels to a value larger than 1 pixel.

8. A method for performing instance segmentation, the method comprising:
generating a learning objective that uses pair-wise relationships between pixels in an input image;
sampling pixels in each object instance to determine whether the sampled pixels are within a same object instance;
training a neural network using the learning objection, wherein the neural network is configured to make pixel-wise predictions and to assign a cluster index to each pixel of the input image, with each pixel cluster being an object instance;
performing a graph coloring to assign a color to each of the object instances, with adjacent object instances having different colors;
performing a connected component extraction to recover each object instance based on the graph coloring; and
generating a rendered image having the assigned color applied to each object instance.

9. The method of claim 8, wherein generating the learning objective comprises:
predicting a mask for each object instance by assigning the cluster index to each pixel in the mask, wherein the cluster index is an integer between 1 and a total number of the object instances.

10. The method of claim 8, wherein a common cluster index is assigned to a background of the input image.

11. The method of claim 8, wherein, based on the sampling, pixels having distance between them that is larger are determined to have no edge between them.

12. The method of claim 8, wherein pixels within a same object instance have a similar predicted label distribution, and pixels from different object instances are dissimilar pairs.

13. The method of claim 8, wherein the neural network comprises a fully convolutional network.

14. The method of claim 8, wherein the processes further comprise relaxing the of the graph coloring by modifying a sampling rule from a constraint to a soft guideline and setting a distance threshold between pixels to a value larger than 1 pixel.

15. A non-transitory computer-readable storage medium containing executable computer program code, the code comprising instructions configured to cause a computing device to:

generate a learning objective that uses pair-wise relationships between pixels in an input image;

sample pixels in each object instance to determine whether the sampled pixels are within a same object instance;

train a neural network using the learning objection, wherein the neural network is configured to make pixel-wise predictions and to assign a cluster index to each pixel of the input image, with each pixel cluster being an object instance;

perform a graph coloring to assign a color to each of the object instances, with adjacent object instances having different colors;

perform a connected component extraction to recover each object instance based on the graph coloring; and generate a rendered image having the assigned color applied to each object instance.

16. The medium of claim 15, wherein generating the learning objective comprises:

predicting a mask for each object instance by assigning the cluster index to each pixel in the mask, wherein the cluster index is an integer between 1 and a total number of the object instances.

17. The medium of claim 15, wherein a common cluster index is assigned to a background of the input image.

18. The medium of claim 15, wherein, based on the sampling, pixels having distance between them that is larger are determined to have no edge between them.

19. The medium of claim 15, wherein pixels within a same object instance have a similar predicted label distribution, and pixels from different object instances are dissimilar pairs.

20. The medium of claim 15, wherein the neural network comprises a fully convolutional network.

* * * * *